US012210447B2

(12) United States Patent
Zhao et al.

(10) Patent No.: US 12,210,447 B2
(45) Date of Patent: Jan. 28, 2025

(54) MANAGING REGIONS OF A MEMORY SYSTEM

(71) Applicant: Micron Technology, Inc., Boise, ID (US)

(72) Inventors: Bin Zhao, Shanghai (CN); Lingyun Wang, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/629,306

(22) PCT Filed: Mar. 16, 2021

(86) PCT No.: PCT/CN2021/081076
§ 371 (c)(1),
(2) Date: Sep. 22, 2022

(87) PCT Pub. No.: WO2022/193130
PCT Pub. Date: Sep. 22, 2022

(65) Prior Publication Data
US 2023/0367706 A1    Nov. 16, 2023

(51) Int. Cl.
*G06F 12/02* (2006.01)

(52) U.S. Cl.
CPC .. *G06F 12/0246* (2013.01); *G06F 2212/7201* (2013.01)

(58) Field of Classification Search
CPC ............... G06F 12/0246; G06F 2212/7201
See application file for complete search history.

(56) References Cited

U.S. PATENT DOCUMENTS

| 2019/0121576 | A1  | 4/2019 | Jean |
| 2020/0233796 | A1* | 7/2020 | Kim ...................... G06F 12/123 |
| 2021/0263852 | A1* | 8/2021 | Seok ................... G06F 12/0891 |
| 2021/0278993 | A1* | 9/2021 | You ........................ G06F 3/0655 |
| 2022/0058116 | A1* | 2/2022 | Kim ..................... G06F 12/0873 |

FOREIGN PATENT DOCUMENTS

WO    2019209707 A1    4/2019

OTHER PUBLICATIONS

Microfsoft dictionary page showing a definition of the term 'timer' (Year: 2002).*
ISA/CN, "International Search Report and Written Opinion of the International Searching Authority," issued in connection with Int'l Appl. No. PCT/CN2021/081076, dated Dec. 15, 2021 (8 pages).

* cited by examiner

*Primary Examiner* — Michael Krofcheck
*Assistant Examiner* — Janice M. Girouard
(74) *Attorney, Agent, or Firm* — Holland & Hart LLP

(57) ABSTRACT

Methods, systems, and devices for managing regions of a memory system are described. A memory system may include a non-volatile memory device and may receive a host performance booster (HPB) command (e.g., a read command) associated with one or more regions of the non-volatile memory device. The memory system may determine whether the region(s) associated with the HPB command are active. In instances where one or more of the associated regions are inactive, the memory system may activate the region(s) and deactivate one or more other regions based on a recency parameter (e.g., a timing parameter). The memory system may process the received HPB command based on the associated region(s) being active.

25 Claims, 5 Drawing Sheets

MANAGING REGIONS OF A MEMORY SYSTEM

CROSS REFERENCE

The present Application for Patent is a 371 national phase filing of International Patent Application No. PCT/CN2021/081076 by Zhao et al., entitled "MANAGING REGIONS OF A MEMORY SYSTEM," filed Mar. 16, 2021, assigned to the assignee hereof, and expressly incorporated by reference herein.

FIELD OF TECHNOLOGY

The following relates generally to one or more systems for memory and more specifically to managing regions of a memory system.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
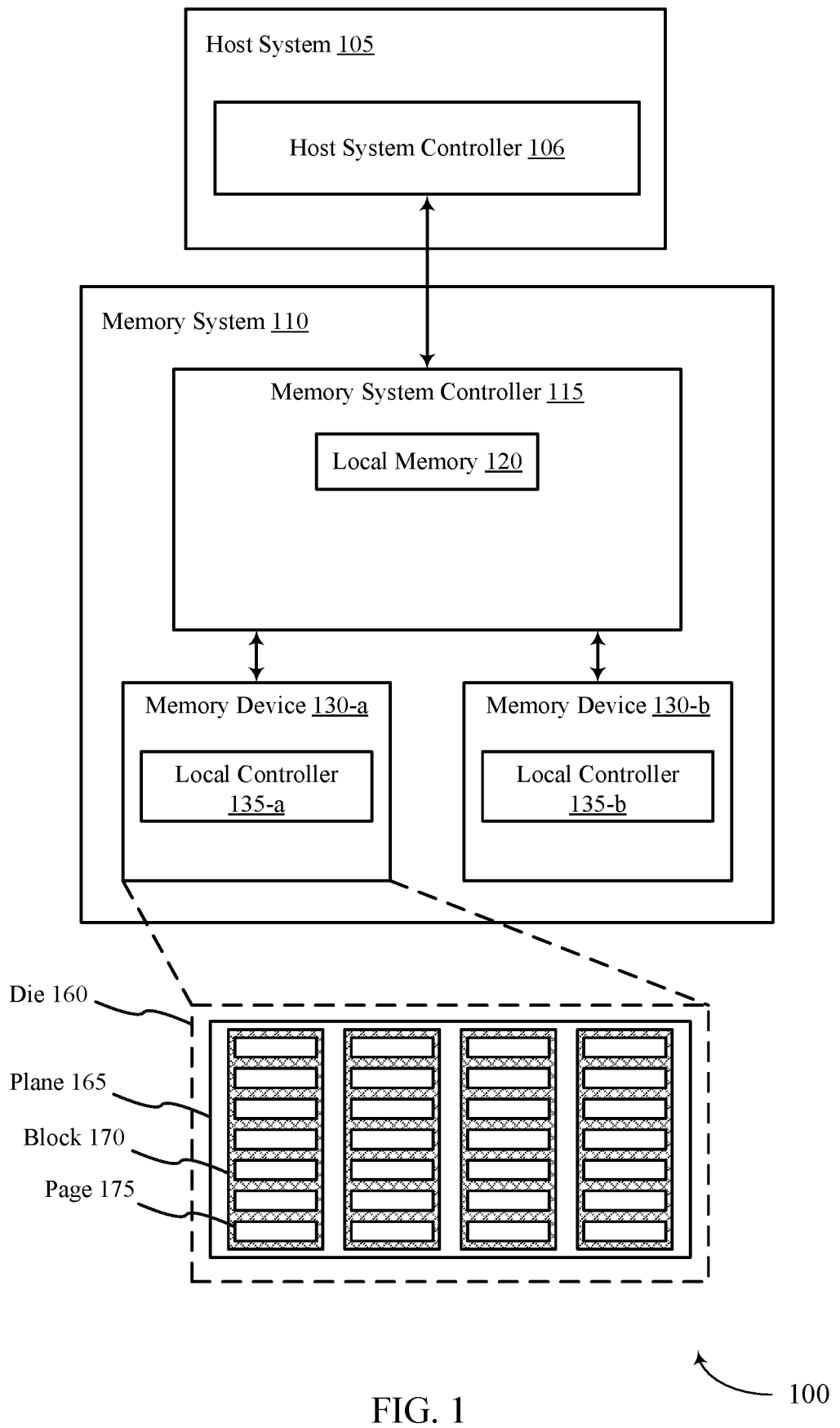
FIG. 1 illustrates an example of a system that supports managing regions of a memory system in accordance with examples as disclosed herein.

High capacity storage systems may perform address translation between logical addressing and physical addressing. A memory controller of a memory system may manage a mapping between logical addresses and physical addresses of the memory system (e.g., a logical-to-physical (L2P) table). Some memory systems include a capability of performing a host performance booster (HPB) operation, where portions of the L2P table are transmitted to a host system. The portions of the L2P table may correspond to active regions of the memory system, and may allow the host system to use the physical addresses for commands. When the host system communicates the physical addresses as part of an HPB command, the memory system may skip some steps of loading portions of the L2P table from NAND into SRAM and identifying the physical address based on the logical block address, which can decrease the amount of time it takes the memory system to implement a command.

In some instances, the memory system (e.g., a memory controller of the memory system) may track active regions in order to process HPB commands received from the host system. For example, the memory system may track active regions so that when an HPB command is received from the host system, the memory system can process the command if the associated region is active. However, the memory system may occasionally receive commands for a larger quantity of data than an active region is configured to store. Thus, the memory system may activate a new region (or regions) in order to process the command. In some instances, the memory system may be able to keep a finite quantity of regions active in the HPB mode, thus prompting the memory system to first deactivate one or more regions. Continually switching regions between being active and inactive may consume both time and power, as well as place unwanted stress on aspects of the memory system. Accordingly, a memory system capable of activating or maintaining regions in an active state based on some parameters (e.g., recency parameters, timing parameters) may be desirable.

A memory system configured to manage active regions of a memory device based on some parameters is described herein. In some examples, a memory system may track recency parameters associated with regions of the memory system. For example, the memory system may track a duration, for each region, from when a prior access operation was performed. Active regions may refer to a subset of regions having undergone an access operation within a threshold duration. Thus, when a command (e.g., an HPB command) is received, the memory system may determine whether a region (or regions) associated with the command is active.

If the region(s) is active, the command may be processed. If the region is inactive, the memory system may activate the region and, in some instances, deactivate one or more regions based on the recency parameters described herein. Upon activating the desired region, the memory system may process the received command (e.g., the HPB command). Accordingly, by activating or deactivating regions as described herein the memory system may switch regions between active and inactive states less frequently, thus saving the memory system both time and power, as well as reducing some stress placed on aspects of the memory system.

Figure 2:
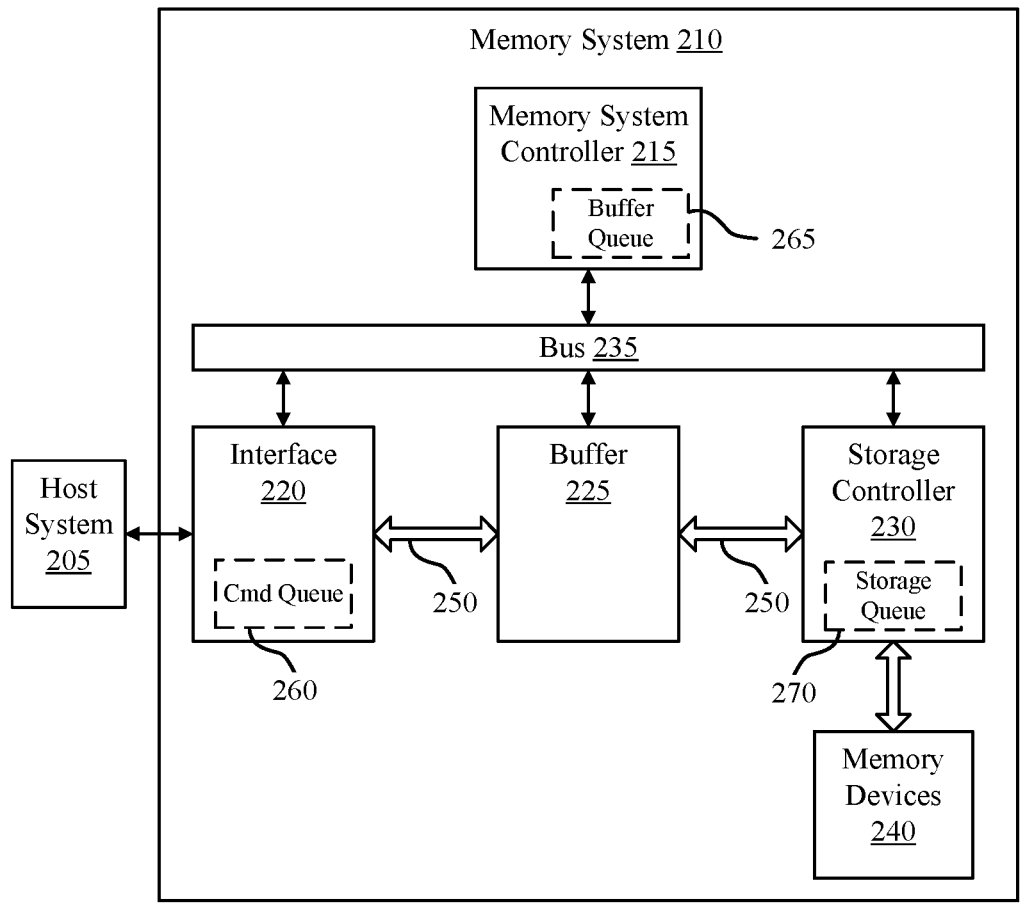
FIG. 2 illustrates an example of a system that supports managing regions of a memory system in accordance with examples as disclosed herein.

Features of the disclosure are initially described in the context of systems with reference to FIGS. 1 and 2. Features of the disclosure are described in the context of a process flow diagram with reference to FIG. 3. These and other features of the disclosure are further illustrated by and described in the context of an apparatus diagram and a flowchart that relate to managing regions of a memory system with reference to FIGS. 4 and 5.

FIG. 1 illustrates an example of a system 100 that supports managing regions of a memory system in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-$a$ and 130-$b$ are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

The system 100 may include any quantity of non-transitory computer readable media that support managing regions of a memory system. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

By way of example, the memory system controller 115 may track one or more active regions of a memory device 130. For example, the memory system 110 may receive, from the host system 105, an HPB command that includes a physical address (or a range of physical addresses) of a memory device 130 used for HPB operations. Upon receiving the command, the memory system controller 115 may identify the region (or regions) corresponding to the physical address(es). If the region is active, then the memory system controller 115 may process the command (e.g., the memory system controller 115 may access the physical address(es)). However, if the region (or regions) corresponding to the physical address(es) is inactive, the memory system controller 115 may activate the region before processing the command.

In some instances, the memory system controller 115 may deactivate a region before activating a region associated with an HPB command. For example, the memory system controller 115 may track access operations performed on each region of the memory devices 130. In particular, the memory system controller 115 may track a recency parameter (e.g., a duration), for each region, that corresponds to a duration since an access operation was performed on a respective region. Regions having undergone an access operation recently may be considered to be relatively "hot," whereas regions having undergone an access operation relatively longer ago may be considered to be relatively "colder." Accordingly, when the memory system controller 115 receives an HPB command for an inactive region, the controller may deactivate one or more regions that are relatively cold in order to activate the region corresponding to the command. By activating or deactivating regions as described herein, the memory system 110 may switch regions between active and inactive states less frequently, thus saving the memory system 110 both time and power, as well as reducing some stress placed on aspects of the memory system 110.

FIG. 2 illustrates an example of a system 200 that supports managing regions of a memory system in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components. In some instances, the memory system controller 215 may be a processor associated with an ASIC. For example, the system 200 may include multiple memory dice. A first memory die may include the interface 220, the buffer 225, the cache 245, and the storage controller 230 and may be controlled by the memory system controller 215. In some examples, a second memory die may include the memory devices 240 and may include a local controller (not shown). The memory dice may communicate with each other using the bus 235.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

In some examples, the memory system controller 215 may track one or more active regions of a memory device 240. For example, the memory system 210 may receive, from the host system 205 and via the interface 220, an HPB command that includes a physical address (or a range of physical addresses) of a memory device 240. Upon receiving the command, the memory system controller 215 may identify the region (or regions) corresponding to the physical address(es). If the region is active, then the memory system controller 215 may process the command (e.g., the memory system controller 215 may access the physical address(es)). However, if the region (or regions) corresponding to the physical address(es) is inactive, the memory system controller 215 may activate the region before processing the command.

In some instances, the memory system controller 215 may deactivate a region before activating a region associated with an HPB command. For example, the memory system controller 215 may track access operations performed on each region of the memory devices 240. In particular, the memory system controller 215 may track a recency parameter (e.g., a duration), for each region, that corresponds to a duration since an access operation was performed on a respective region. Regions having undergone an access operation recently may be considered to be relatively "hot," whereas regions having undergone an access operation relatively longer ago may be considered to be relatively "colder." Accordingly, when the memory system controller 215 receives an HPB command for an inactive region, the controller may deactivate one or more regions that are relatively cold in order to activate the region corresponding to the command. By activating or deactivating regions as described herein, the memory system 210 may switch regions between active and inactive states less frequently, thus saving the memory system 210 both time and power, as well as reducing some stress placed on aspects of the memory system 210.

Figure 3:
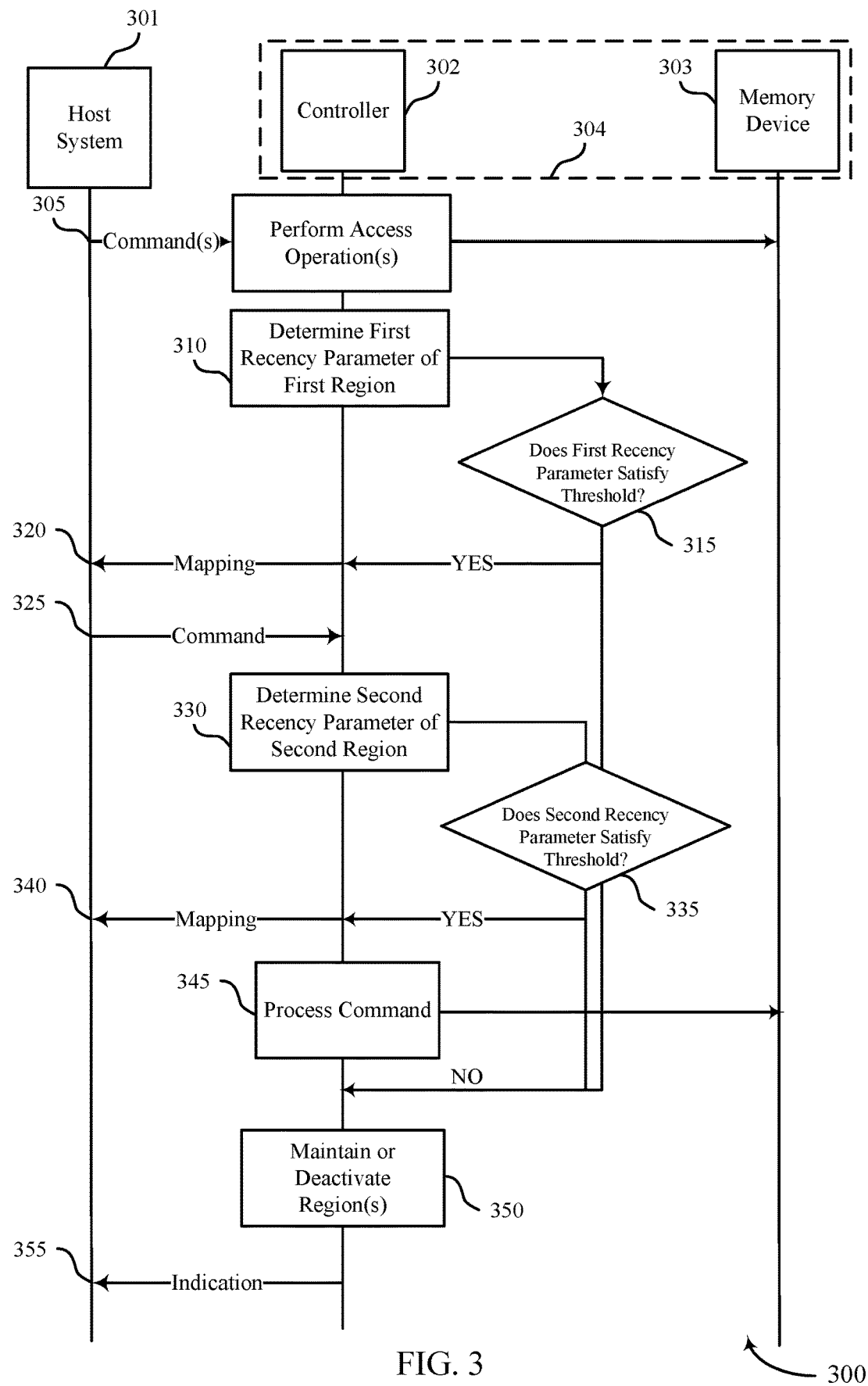
FIG. 3 illustrates an example of a process flow diagram that supports managing regions of a memory system in accordance with examples as disclosed herein.

FIG. 3 illustrates an example of a process flow diagram 300 that supports managing regions of a memory system in accordance with examples as disclosed herein. The features of the process flow diagram 300 may implemented or performed by a memory system 304, which may be an example of the memory system 110 or the memory system 210 described with reference to FIGS. 1 and 2, respectively. The memory system 304 may include a controller 302 (e.g., a memory system controller 302) and a memory device 303 (e.g., a non-volatile memory device 303), which may be examples of a memory system controller 215 and a memory device 240 as described with reference to FIG. 2. In some examples, the process flow diagram 300 may illustrate operations that occur within the memory system 304 and between the memory system 304 and a host system 301.

Some steps illustrated by the process flow diagram 300 may be implemented as part of an HPB mode or operation. For example, one or more steps illustrated by the process flow diagram 300 may be associated with or performed in response to the host system 301 transmitting a command (e.g., a read command) to the memory system 304 that includes a physical address of memory cells to be read. Operating in an HPB mode may increase the speed and efficiency of performing read commands because the memory system 304 may not translate a logical address of the specific command to a physical address. Moreover, as described below, the memory system 304 may be configured to manage active regions of the memory device 303. For example, the memory system 304 may activate one or more regions associated with a received command based one or more recency parameters. Accordingly, the memory system 304 may switch regions between active and inactive states less frequently, thus saving the memory system 304 both time and power, as well as reducing some stress placed on aspects of the memory system 304.

At 305, the host system 301 may transmit one or more commands (e.g., access commands) to the memory system 304. In some examples, the commands may be received by the controller 302, and the controller may perform associated operations (e.g., access operations) on the memory device 303. For example, the host system 301 may transmit one or more read commands to the memory system 304. In some examples, the commands may be HPB commands, and in other examples the commands may not be HPB commands.

As described herein, an HPB command may refer to a command, received from the host system 301, that includes a physical address of the memory device 303. For example, the controller 302 may maintain or have access to a L2P table that has a complete mapping between logical addresses and physical addresses of the memory device 303 (e.g., of the non-volatile memory device 303). When a non-HPB command (e.g., a command that includes a logical address) is received, the controller 302 may access a portion of the L2P table and perform an address translation to determine the corresponding physical address. Additionally or alternatively, an HPB command may include the physical address of one or more memory device 303 to be accessed, which may cause the memory system to skip the address translation procedures as part of implementing the operation requested by the command.

In some examples, the controller 302 may also track a recency parameter associated with each region of the memory device 303. As used herein, a "region" may refer to a physical portion (e.g., a row, a block, etc.) of the memory device 303 that is configured to store a finite quantity of data. In some examples, each region of the memory device 303 may be associated with a same quantity of LBAs, physical addresses, or both. A "recency parameter" may refer to a measure of how recently a respective region was accessed by an access operation, how frequently a respective region is accessed over a duration, how likely a respective region is to be accessed in the future, or a combination thereof. In some examples, to measure the recency parameter, the controller 302 may be configured to maintain a ranking of regions. When a region is accessed, the region may be moved to the top of the ranking. Thus, through regular sorting, the ranking may be list of how recently each region was accessed relative to the other regions. Hotness of a particular region may be determined based on the index in the ranking being above or below a threshold. In some examples, timers may be used to measure the recency parameter. That is, the controller 302 may be configured to operate one or more timers, and may initiate a timer associated with a region when an access operation is performed on the respective region. When a subsequent access operation is performed on the same region, the timer may be reset or restarted. The recency parameters tracked by the controller 302 may be used for activating or deactivating respective regions, as described herein.

At 310, the controller 302 may determine a first recency parameter associated with a first region of the memory device 303. As described herein, a recency parameter may refer to a duration since an access operation was performed on a respective region. For example, the first recency parameter associated with the first region may be 1 ns, which may mean that an access operation was last performed on the first region 1 ns ago (e.g., from the time of measuring the first recency parameter).

At 315, the controller 302 may determine whether the first recency parameter associated with the first region of the memory device 303 satisfies a threshold. The controller may determine whether the first recency parameter satisfies a threshold to determine whether to activate the first region (e.g., whether the first region is an "active region"). As described herein, the controller 302 may transmit one or more portions of an L2P table to the host system 301 for use in HPB operations. The portions of the L2P table, which includes physical addresses of the memory device 303, may correspond to "active regions" of the memory device 303. That is, an "active region" may refer to one or more portions of one or more memory devices 303 (e.g., logical block addresses or physical addresses) that are capable of being used as part of an HPB operation. An HPB command may include (among other things) a physical address rather than a logical block address in the command. Such a feature may allow the memory system to skip some address translation steps and thereby save time. The HPB operations may be facilitated by the portion of the L2P table being located at the host system 301, which may allow the host system 301 to perform the address translation steps before transmitting the HPB command.

The recency parameters tracked by the controller 302 may be used for determining how "hot" a region is. Because a "hotter" region—e.g., a region having undergone an access operation relatively recently—may be more susceptible to future access operations within a duration, it may be advantageous to maintain the region in an active state. Conversely, because a "colder region"—e.g., a region not having undergone any access operations relatively recently—may be less susceptible to future access operations within a duration, it may be advantageous to maintain the region in an inactive state so that a "hotter" region may be activated (or kept active).

In a first example, the controller 302 may determine whether the first recency parameter associated with the first region of the memory device 303 satisfies a threshold by determining whether an index associated with the first region is greater than an index threshold in a ranking of regions managed by the controller 302. That is, the controller 302 may manage a listing (e.g., a table) that ranks the recency parameters of each region of the memory device 303 in a sequential order. Each listing may be associated with an index, and a finite quantity of regions (e.g., one hundred (100) regions) may be active at any one time). Accordingly, the controller 302 may determine whether the index associated with the first recency parameter is included in the finite quantity of regions. The controller 302 may maintain the ranking by moving a region to the top of the list when an access operation is performed on the region. By ordering the ranking in such a way after access operations may result in an ordered list of regions by how recently the region was accessed relative to the other regions.

In a second example, the controller 302 may determine whether the first recency parameter associated with the first region of the memory device 303 satisfies a threshold by determining whether an access operation was performed on the first region within a duration (e.g., a window of time). That is, the threshold may correspond to a finite duration and the controller 302 may be configured to compare the first recency parameter to the duration in order to determine whether the threshold is satisfied.

At 320, the controller 302 may have determined that the first recency parameter associated with the first region satisfies the threshold. Accordingly, the controller 302 may activate the first region by transmitting, to the host system 301, a portion of an L2P table. The portion of the L2P table may include a mapping between logical addresses and physical addresses of the first region of the memory device 303, and may be used by the host system 301 to issue one or more HPB commands. In some examples, the portion of the L2P table may be loaded from the memory device 303 and transmitted to the host system 301, while in other examples the portion of the L2P table may have been previously loaded to a cache associated with the memory system 304 and thus may be transmitted from the cache to the host system 301 via the controller 302.

At 325, the host system 301 may transmit a command to the memory system 304. In some examples, the command may be a read command that includes a physical address associated with the first region of the memory device 303 (e.g., the command may be an HPB command), which may have been included in the L2P transmitted to the host system 301 (e.g., at 320). In some examples, the command may be a random read command where addresses (e.g., physical addresses or logical addresses) of the memory device 303 are selected by the host system 301 at random. Additionally or alternatively, the command may include a logical address associated with a second region of the memory device 303. That is, the command may be associated with a quantity of data that is larger than the quantity of data stored in the first region. In some examples, the memory system 304 may activate the second region before processing the command received at 325.

At 330, the controller 302 may determine a second recency parameter associated with a second region of the memory device 303. For example, the first recency parameter associated with the first region may be 2 ns, which may mean that an access operation was last performed on the first region 2 ns ago (e.g., from the time of measuring the first recency parameter).

At 335, the controller 302 may determine whether the second recency parameter associated with the second region of the memory device 303 satisfies the threshold. The controller may determine whether the second recency parameter satisfies a threshold to determine whether to activate the second region and process the command (e.g., received at 325). As described above with reference to 315, the controller 302 may determine whether the second recency parameter associated with the second region of the memory device 303 satisfies the threshold using one of two examples.

At 340, the controller 302 may have determined that the second recency parameter associated with the second region satisfies the threshold. Accordingly, the controller 302 may activate the second region by transmitting, to the host system 301, a portion of an L2P table. The portion of the L2P table may include a mapping between logical addresses and physical addresses of the second region of the memory device 303. Moreover, by activating the second region, the controller may process the command received at 325. Accordingly, at 345, the controller 302 may process the command by accessing the physical addresses associated with the command. For example, the controller 302 may activate a physical address of the memory device 303 that is included in the first region, and a physical address of the memory device that is included in the second region.

At 350, one or more regions may be deactivated or maintained in an inactive state. In some examples, the first region, the second region, or another region associated with a command (e.g., an HPB command) may be associated with a recency parameter that does not satisfy a threshold value. For example, at 315, if the controller 302 determines that the first recency parameter does not satisfy the threshold then the first region may not be activated. Moreover, at 335, if the if the controller 302 determines that the second recency parameter does not satisfy the threshold then the second region may not be activated.

Additionally or alternatively, the controller 302 may deactivate one or more regions based on receiving a command (e.g., a second command, a second HPB command). For example, the second command may be associated with a third region of the memory device 303 and the controller 302 may determine whether a third recency parameter associated with the third region of the memory device 303 satisfies a threshold. The controller 302 may make the determination based on whether an index associated with the third region is greater than an index threshold in a ranking of regions managed by the controller 302. That is, the controller 302 may manage a listing (e.g., a table) that ranks the recency parameters of each region of the memory device 303 in a sequential order. Using the examples described herein with reference to FIG. 3, the controller 302 may deactivate the first region and activate the third region based on an address associated with the third region being included in the second command and the index of the first region being below the index threshold. In such examples, the third region may be activated and the second command may be processed accordingly.

In a second example, the controller 302 may determine whether the third recency parameter associated with the third region of the memory device 303 satisfies a threshold by determining whether an access operation was performed on the third region within a duration. That is, the threshold may correspond to a finite duration and the controller 302 may be configured to compare the third recency parameter to the duration in order to determine whether the threshold is satisfied. Using the examples described herein with reference to FIG. 3, the controller 302 may deactivate the first region and activate the third region based on an address associated with the third region being included in the second command and an access operation not having been performed on the first region within a threshold duration.

At 355, the controller 302 may transmit an indication to the host system 301. In some examples (e.g., upon successfully processing a command), the indication may inform the host system 301 that a corresponding command was successfully executed. Additionally or alternatively, when a region is deactivated or maintained in an inactive state, it may not be a part of an HPB mode. Accordingly, the controller 302 may indicate to the host system 301 that the region is not active or has been deactivated, and the host system 301 may invalidate any pending HPB operations associated with the inactive or deactivated region. The controller 302 may continue activating and deactivating regions as described herein in order to effectively switch regions between active and inactive states less frequently.

Accordingly, the steps described herein with respect to FIG. 3 may save the memory system 304 both time and power, as well as reduce some stress placed on aspects of the memory system 304. Moreover, in the aforementioned description of the process flow diagram 300, one or more operations may be performed in different orders or at different times than illustrated. Thus the steps and ordering illustrated by FIG. 3 is for exemplary purposes only, and the steps may be performed in any order.

Figure 4:
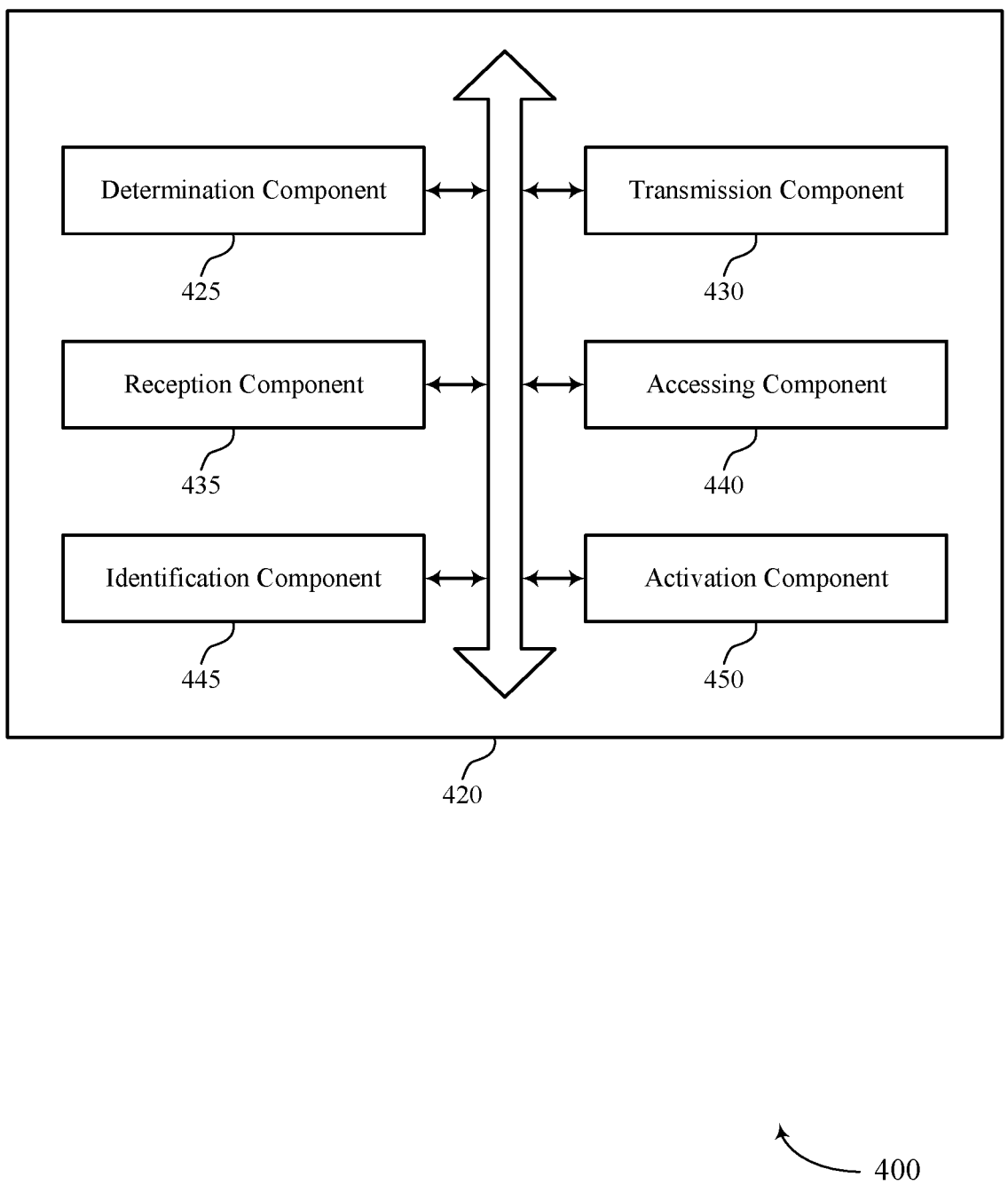
FIG. 4 shows a block diagram of a memory system that supports managing regions of a memory system in accordance with examples as disclosed herein.

FIG. 4 shows a block diagram 400 of a memory system 420 that supports managing regions of a memory system in accordance with examples as disclosed herein. The memory system 420 may be an example of aspects of a memory system as described with reference to FIGS. 1 through 4. The memory system 420, or various components thereof, may be an example of means for performing various aspects of managing regions of a memory system as described herein. For example, the memory system 420 may include a determination component 425, a transmission component 430, a reception component 435, an accessing component 440, an identification component 445, an activation component 450, or any combination thereof. Each of these components may communicate, directly or indirectly, with one another (e.g., via one or more buses).

The determination component 425 may be configured as or otherwise support a means for determining whether a first recency parameter associated with a first region of the non-volatile memory device satisfies a threshold. The transmission component 430 may be configured as or otherwise support a means for transmitting, to a host system, a first portion of a mapping that indicates relationships between logical addresses and physical addresses of the non-volatile memory device in the first region based at least in part on determining that the first recency parameter associated with the first region of the non-volatile memory device satisfies the threshold. The reception component 435 may be configured as or otherwise support a means for receiving a read command to read data that is stored in the first region and a second region of the non-volatile memory device, the read command including a physical address of the non-volatile memory device from the first portion of the mapping. In some examples, the transmission component 430 may be configured as or otherwise support a means for transmitting, to the host system, a second portion of the mapping that indicates relationships between logical addresses and physical addresses of the non-volatile memory device in the second region based at least in part on determining that the first recency parameter associated with the first region of the non-volatile memory device satisfies the threshold, a second recency parameter associated with the second region of the non-volatile memory device satisfies the threshold, and receiving the read command.

In some examples, to support determining whether the first recency parameter satisfies the threshold, the determination component 425 may be configured as or otherwise support a means for determining whether an index associated with the first region is greater than an index threshold in a ranking of regions indicating which regions were accessed most recently.

In some examples, the determination component 425 may be configured as or otherwise support a means for determining, for each of a plurality of regions of the non-volatile memory device, a respective recency parameter, where the recency parameters include a duration elapsed since performing an access operation on the respective region of the plurality of regions and the plurality of regions of the non-volatile memory device include the first region.

In some examples, the determination component 425 may be configured as or otherwise support a means for determining the second recency parameter associated with the second region based at least in part on receiving the read command. In some examples, the determination component 425 may be configured as or otherwise support a means for determining that the first recency parameter satisfies the threshold by determining that an access operation was performed on the first region of the non-volatile memory device within a duration. In some examples, the accessing component 440 may be configured as or otherwise support a means for determining that the second recency parameter satisfies the threshold by determining that an access operation was performed on the second region of the non-volatile memory device within the duration, where transmitting the second portion of the mapping to the host system is based at least in part on determining that the second recency parameter satisfies the threshold by determining that the access operation was performed on the second region of the non-volatile memory device within the duration.

In some examples, the accessing component 440 may be configured as or otherwise support a means for performing a read operation on the second region of the non-volatile memory device based at least in part on receiving the read command.

In some examples, the identification component 445 may be configured as or otherwise support a means for identifying that the physical address included in the read command is in the first region of the non-volatile memory device based at least in part on receiving the read command.

In some examples, the activation component 450 may be configured as or otherwise support a means for activating the first region to use as part of a host performance booster mode, where transmitting the first portion of the mapping is part of activating the first region to use as part of the host performance booster mode.

In some examples, the activation component 450 may be configured as or otherwise support a means for deactivating the first region from being part of the host performance booster mode based at least in part on determining that the first recency parameter associated with the first region does not satisfy the threshold. In some examples, the transmission component 430 may be configured as or otherwise support a means for transmitting, to the host system, an indication that the first region of the non-volatile memory device is deactivated and a third region of the non-volatile memory device is activated.

In some examples, the activation component 450 may be configured as or otherwise support a means for activating the third region of the non-volatile memory device to use as part of the host performance booster mode based at least in part on deactivating the first region of the non-volatile memory device. In some examples, the accessing component 440 may be configured as or otherwise support a means for performing a second read operation on at least the third region of the non-volatile memory device based at least in part on activating the third region of the non-volatile memory device.

In some examples, the activation component 450 may be configured as or otherwise support a means for maintaining the first region as an active region based at least in part on determining that the first recency parameter associated with the first region of the non-volatile memory device satisfies the threshold.

In some examples, the first region includes a first quantity of data and is associated with a first quantity of LBAs and the second region includes the first quantity of data and is associated with the first quantity of LBAs.

In some examples, the read command includes a performance booster mode command.

Figure 5:
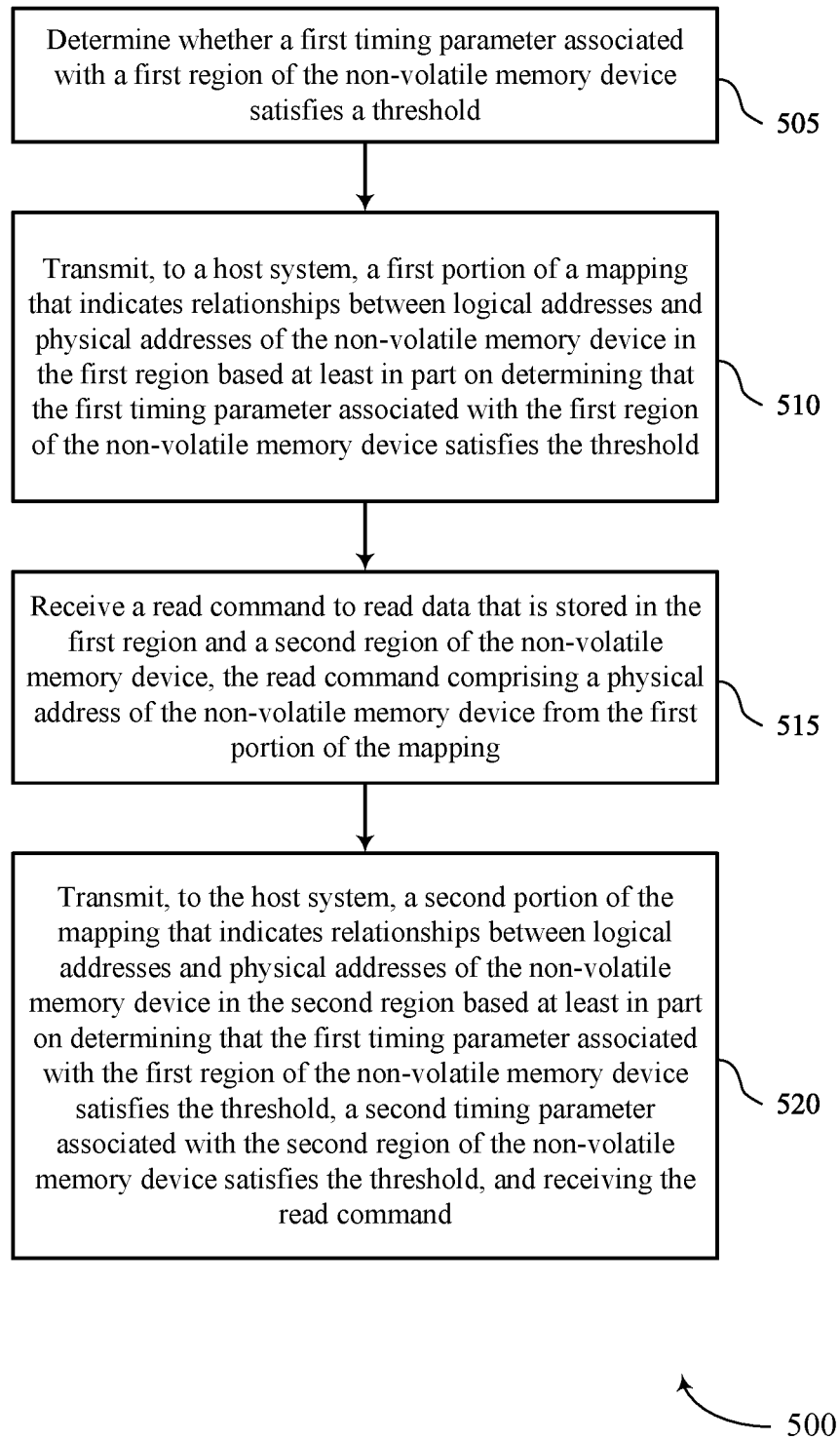
FIG. 5 shows a flowchart illustrating a method or methods that support managing regions of a memory system in accordance with examples as disclosed herein.

FIG. 5 shows a flowchart illustrating a method 500 that supports managing regions of a memory system in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally or alternatively, the memory system may perform aspects of the described functions using special-purpose hardware.

At 505, the method may include determining whether a first recency parameter associated with a first region of the non-volatile memory device satisfies a threshold. The operations of 505 may be performed in accordance with examples as disclosed herein. In some examples, aspects of the operations of 505 may be performed by a determination component 425 as described with reference to FIG. 4.

At 510, the method may include transmitting, to a host system, a first portion of a mapping that indicates relationships between logical addresses and physical addresses of the non-volatile memory device in the first region based at least in part on determining that the first recency parameter associated with the first region of the non-volatile memory device satisfies the threshold. The operations of 510 may be performed in accordance with examples as disclosed herein. In some examples, aspects of the operations of 510 may be performed by a transmission component 430 as described with reference to FIG. 4.

At 515, the method may include receiving a read command to read data that is stored in the first region and a second region of the non-volatile memory device, the read command including a physical address of the non-volatile memory device from the first portion of the mapping. The operations of 515 may be performed in accordance with examples as disclosed herein. In some examples, aspects of the operations of 515 may be performed by a reception component 435 as described with reference to FIG. 4.

At 520, the method may include transmitting, to the host system, a second portion of the mapping that indicates relationships between logical addresses and physical addresses of the non-volatile memory device in the second region based at least in part on determining that the first recency parameter associated with the first region of the non-volatile memory device satisfies the threshold, a second recency parameter associated with the second region of the non-volatile memory device satisfies the threshold, and receiving the read command. The operations of 520 may be performed in accordance with examples as disclosed herein. In some examples, aspects of the operations of 520 may be performed by a transmission component 430 as described with reference to FIG. 4.

In some examples, an apparatus as described herein may perform a method or methods, such as the method 500. The apparatus may include, features, circuitry, logic, means, or instructions (e.g., a non-transitory computer-readable medium storing instructions executable by a processor) for determining whether a first recency parameter associated with a first region of the non-volatile memory device satisfies a threshold, transmitting, to a host system, a first portion of a mapping that indicates relationships between logical addresses and physical addresses of the non-volatile memory device in the first region based at least in part on determining that the first recency parameter associated with the first region of the non-volatile memory device satisfies the threshold, receiving a read command to read data that is stored in the first region and a second region of the non-volatile memory device, the read command including a physical address of the non-volatile memory device from the first portion of the mapping, and transmitting, to the host system, a second portion of the mapping that indicates relationships between logical addresses and physical addresses of the non-volatile memory device in the second region based at least in part on determining that the first recency parameter associated with the first region of the non-volatile memory device satisfies the threshold, a second recency parameter associated with the second region of the non-volatile memory device satisfies the threshold, and receiving the read command.

In some examples of the method 500 and the apparatus described herein, determining whether the first recency parameter satisfies the threshold may include operations, features, circuitry, logic, means, or instructions for determining whether an index associated with the first region may be greater than an index threshold in a ranking of regions indicating which regions were accessed most recently.

Some examples of the method 500 and the apparatus described herein may further include operations, features, circuitry, logic, means, or instructions for determining, for each of a plurality of regions of the non-volatile memory device, a respective recency parameter, where the recency parameters include a duration elapsed since performing an access operation on the respective region of the plurality of regions and the plurality of regions of the non-volatile memory device include the first region.

Some examples of the method 500 and the apparatus described herein may further include operations, features, circuitry, logic, means, or instructions for determining the second recency parameter associated with the second region based at least in part on receiving the read command, determining that the first recency parameter satisfies the threshold by determining that an access operation was performed on the first region of the non-volatile memory device within a duration, and determining that the second recency parameter satisfies the threshold by determining that an access operation was performed on the second region of the non-volatile memory device within the duration, where transmitting the second portion of the mapping to the host system may be based at least in part on determining that the second recency parameter satisfies the threshold by determining that the access operation was performed on the second region of the non-volatile memory device within the duration.

Some examples of the method 500 and the apparatus described herein may further include operations, features, circuitry, logic, means, or instructions for performing a read operation on the second region of the non-volatile memory device based at least in part on receiving the read command.

Some examples of the method 500 and the apparatus described herein may further include operations, features, circuitry, logic, means, or instructions for identifying that the physical address included in the read command may be in the first region of the non-volatile memory device based at least in part on receiving the read command.

Some examples of the method 500 and the apparatus described herein may further include operations, features, circuitry, logic, means, or instructions for activating the first region to use as part of a host performance booster mode, where transmitting the first portion of the mapping may be part of activating the first region to use as part of the host performance booster mode.

Some examples of the method 500 and the apparatus described herein may further include operations, features, circuitry, logic, means, or instructions for deactivating the first region from being part of the host performance booster mode based at least in part on determining that the first recency parameter associated with the first region does not satisfy the threshold and transmitting, to the host system, an indication that the first region of the non-volatile memory device may be deactivated and a third region of the non-volatile memory device may be activated.

Some examples of the method 500 and the apparatus described herein may further include operations, features, circuitry, logic, means, or instructions for activating the third region of the non-volatile memory device to use as part of the host performance booster mode based at least in part on deactivating the first region of the non-volatile memory device and performing a second read operation on at least the third region of the non-volatile memory device based at least in part on activating the third region of the non-volatile memory device.

Some examples of the method 500 and the apparatus described herein may further include operations, features, circuitry, logic, means, or instructions for maintaining the first region as an active region based at least in part on determining that the first recency parameter associated with the first region of the non-volatile memory device satisfies the threshold.

In some examples of the method 500 and the apparatus described herein, the first region includes a first quantity of data and may be associated with a first quantity of LBAs and the second region includes the first quantity of data and may be associated with the first quantity of LBAs.

In some examples of the method 500 and the apparatus described herein, the read command includes a performance booster mode command.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
   one or more non-volatile memory devices; and
   processing circuitry coupled with the one or more non-volatile memory devices, wherein the processing circuitry is configured to cause the memory system to:
   initiate a timer corresponding to a first region in response to performing one or more access operations for data stored at the first region;
   determine whether a first recency parameter associated with the first region of the one or more non-volatile memory devices satisfies a threshold, wherein the first recency parameter is based at least in part on a value of the timer;
   transmit, to a host system, a first portion of a mapping that indicates relationships between logical addresses and physical addresses of the one or more non-volatile memory devices in the first region based at least in part on determining that the first recency parameter associated with the first region of the one or more non-volatile memory devices satisfies the threshold;
   receive a read command to read data that is stored in the first region and a second region of the one or more non-volatile memory devices, the read command comprising a physical address of the one or more non-volatile memory devices from the first portion of the mapping; and
   transmit, to the host system, a second portion of the mapping that indicates relationships between logical addresses and physical addresses of the one or more non-volatile memory devices in the second region based at least in part on determining that the first recency parameter associated with the first region of the one or more non-volatile memory devices satisfies the threshold, a second recency parameter associated with the second region of the one or more non-volatile memory devices satisfies the threshold, and receiving the read command.

2. The memory system of claim 1, wherein to determine whether the first recency parameter satisfies the threshold, the processing circuitry is further configured to cause the memory system to:
   determine whether an index associated with the first region is greater than an index threshold in a ranking of regions indicating which regions were accessed most recently.

3. The memory system of claim 1, wherein the processing circuitry is further configured to cause the memory system to:
   determine, for each of a plurality of regions of the one or more non-volatile memory devices, a respective recency parameter, wherein the respective recency parameters comprise a duration elapsed since performing an access operation on the respective region of the plurality of regions and the plurality of regions of the one or more non-volatile memory devices include the first region.

4. The memory system of claim 3, wherein the processing circuitry is further configured to cause the memory system to:
   determine the second recency parameter associated with the second region based at least in part on receiving the read command;
   determine that the first recency parameter satisfies the threshold by determining that an access operation was performed on the first region of the one or more non-volatile memory devices within a duration; and
   determine that the second recency parameter satisfies the threshold by determining that an access operation was performed on the second region of the one or more non-volatile memory devices within the duration, wherein transmitting the second portion of the mapping to the host system is based at least in part on determining that the second recency parameter satisfies the threshold by determining that the access operation was performed on the second region of the one or more non-volatile memory devices within the duration.

5. The memory system of claim 1, wherein the processing circuitry is further configured to cause the memory system to:

perform a read operation on the second region of the one or more non-volatile memory devices based at least in part on receiving the read command.

6. The memory system of claim 1, wherein the processing circuitry is further configured to cause the memory system to:
identify that the physical address included in the read command is in the first region of the one or more non-volatile memory devices based at least in part on receiving the read command.

7. The memory system of claim 1, wherein the processing circuitry is further configured to cause the memory system to:
activate the first region to use as part of a host performance booster mode, wherein transmitting the first portion of the mapping is part of activating the first region to use as part of the host performance booster mode.

8. The memory system of claim 7, wherein the processing circuitry is further configured to cause the memory system to:
deactivate the first region from being part of the host performance booster mode based at least in part on determining that the first recency parameter associated with the first region does not satisfy the threshold; and
transmit, to the host system, an indication that the first region of the one or more non-volatile memory devices is deactivated and a third region of the one or more non-volatile memory devices is activated.

9. The memory system of claim 8, wherein the processing circuitry is further configured to cause the memory system to:
activate the third region of the one or more non-volatile memory devices to use as part of the host performance booster mode based at least in part on deactivating the first region of the one or more non-volatile memory devices; and
perform a second read operation on at least the third region of the one or more non-volatile memory devices based at least in part on activating the third region of the one or more non-volatile memory devices.

10. The memory system of claim 1, wherein the processing circuitry is further configured to cause the memory system to:
maintain the first region as an active region based at least in part on determining that the first recency parameter associated with the first region of the one or more non-volatile memory devices satisfies the threshold.

11. The memory system of claim 1, wherein the first region comprises a first quantity of data and is associated with a first quantity of logical block addresses (LBAs) and the second region comprises the first quantity of data and is associated with the first quantity of LBAs.

12. The memory system of claim 1, wherein the read command comprises a performance booster mode command.

13. A non-transitory computer-readable medium storing code comprising instructions which, when executed by a processor of an electronic device, cause the electronic device to:
initiate a timer corresponding to a first region in response to performing one or more access operations for data stored at the first region;
determine whether a first recency parameter associated with the first region of a non-volatile memory device satisfies a threshold, wherein the first recency parameter is based at least in part on a value of the timer;
transmit, to a host system, a first portion of a mapping that indicates relationships between logical addresses and physical addresses of the non-volatile memory device in the first region based at least in part on determining that the first recency parameter associated with the first region of the non-volatile memory device satisfies the threshold;
receive a read command to read data that is stored in the first region and a second region of the non-volatile memory device, the read command comprising a physical address of the non-volatile memory device from the first portion of the mapping; and
transmit, to the host system, a second portion of the mapping that indicates relationships between logical addresses and physical addresses of the non-volatile memory device in the second region based at least in part on determining that the first recency parameter associated with the first region of the non-volatile memory device satisfies the threshold, a second recency parameter associated with the second region of the non-volatile memory device satisfies the threshold, and receiving the read command.

14. The non-transitory computer-readable medium of claim 13, wherein the instructions, when executed by the processor of the electronic device, further cause the electronic device to determine whether the first recency parameter satisfies the threshold by:
determining whether an index associated with the first region is greater than an index threshold in a ranking of regions indicating which regions were accessed most recently.

15. The non-transitory computer-readable medium of claim 13, wherein the instructions, when executed by the processor of the electronic device, further cause the electronic device to:
determine, for each of a plurality of regions of the non-volatile memory device, a respective recency parameter, wherein the respective recency parameters comprise a duration elapsed since performing an access operation on the respective region of the plurality of regions and the plurality of regions of the non-volatile memory device include the first region.

16. The non-transitory computer-readable medium of claim 15, wherein the instructions, when executed by the processor of the electronic device, further cause the electronic device to:
determine the second recency parameter associated with the second region based at least in part on receiving the read command;
determine that the first recency parameter satisfies the threshold by determining that an access operation was performed on the first region of the non-volatile memory device within a duration; and
determine that the second recency parameter satisfies the threshold by determining that an access operation was performed on the second region of the non-volatile memory device within the duration, wherein transmitting the second portion of the mapping to the host system is based at least in part on determining that the second recency parameter satisfies the threshold by determining that the access operation was performed on the second region of the non-volatile memory device within the duration.

17. The non-transitory computer-readable medium of claim 13, wherein the instructions, when executed by the processor of the electronic device, further cause the electronic device to:

perform a read operation on the second region of the non-volatile memory device based at least in part on receiving the read command.

18. The non-transitory computer-readable medium of claim 13, wherein the instructions, when executed by the processor of the electronic device, further cause the electronic device to:
identify that the physical address included in the read command is in the first region of the non-volatile memory device based at least in part on receiving the read command.

19. The non-transitory computer-readable medium of claim 13, wherein the instructions, when executed by the processor of the electronic device, further cause the electronic device to:
activate the first region to use as part of a host performance booster mode, wherein transmitting the first portion of the mapping is part of activating the first region to use as part of the host performance booster mode.

20. The non-transitory computer-readable medium of claim 19, wherein the instructions, when executed by the processor of the electronic device, further cause the electronic device to:
deactivate the first region from being part of the host performance booster mode based at least in part on determining that the first recency parameter associated with the first region does not satisfy the threshold; and
transmit, to the host system, an indication that the first region of the non-volatile memory device is deactivated and a third region of the non-volatile memory device is activated.

21. The non-transitory computer-readable medium of claim 20, wherein the instructions, when executed by the processor of the electronic device, further cause the electronic device to:
activate the third region of the non-volatile memory device to use as part of the host performance booster mode based at least in part on deactivating the first region of the non-volatile memory device; and
perform a second read operation on at least the third region of the non-volatile memory device based at least in part on activating the third region of the non-volatile memory device.

22. The non-transitory computer-readable medium of claim 13, wherein the instructions, when executed by the processor of the electronic device, further cause the electronic device to:
maintain the first region as an active region based at least in part on determining that the first recency parameter associated with the first region of the non-volatile memory device satisfies the threshold.

23. The non-transitory computer-readable medium of claim 13, wherein the first region comprises a first quantity of data and is associated with a first quantity of logical block addresses (LBAs) and the second region comprises the first quantity of data and is associated with the first quantity of LBAs.

24. The non-transitory computer-readable medium of claim 13, wherein the read command comprises a performance booster mode command.

25. A method, comprising:
initiating a timer corresponding to a first region in response to performing one or more access operations for data stored at the first region;
determining whether a first recency parameter associated with the first region of a non-volatile memory device satisfies a threshold, wherein the first recency parameter is based at least in part on a value of the timer;
transmitting, to a host system, a first portion of a mapping that indicates relationships between logical addresses and physical addresses of the non-volatile memory device in the first region based at least in part on determining that the first recency parameter associated with the first region of the non-volatile memory device satisfies the threshold;
receiving a read command to read data that is stored in the first region and a second region of the non-volatile memory device, the read command comprising a physical address of the non-volatile memory device from the first portion of the mapping; and
transmitting, to the host system, a second portion of the mapping that indicates relationships between logical addresses and physical addresses of the non-volatile memory device in the second region based at least in part on determining that the first recency parameter associated with the first region of the non-volatile memory device satisfies the threshold, a second recency parameter associated with the second region of the non-volatile memory device satisfies the threshold, and receiving the read command.

* * * * *